United States Patent [19]

Adams

[11] Patent Number: 4,487,225
[45] Date of Patent: Dec. 11, 1984

[54] POWER ASSISTED STEERING GEAR

[75] Inventor: Frederick J. Adams, Clevedon, England

[73] Assignee: Cam Gears Limited, Hertfordshire, England

[21] Appl. No.: 442,246

[22] Filed: Nov. 17, 1982

[30] Foreign Application Priority Data

Nov. 18, 1981 [GB] United Kingdom ............... 8134712

[51] Int. Cl.³ ............................................. F15B 9/00
[52] U.S. Cl. ........................ 137/625.22; 91/375 A; 91/375 R
[58] Field of Search .................. 137/625.24, 625.21, 137/625.22, 625.23; 91/375 R, 375 A

[56] References Cited

U.S. PATENT DOCUMENTS

| | | | |
|---|---|---|---|
| 3,145,626 | 8/1964 | Vickers | 137/625.24 X |
| 3,296,939 | 1/1967 | Eddy | 91/375 A |
| 4,378,030 | 3/1983 | Duffy | 137/625.24 |
| 4,428,399 | 1/1984 | Masuda | 137/625.22 |

Primary Examiner—Alan Cohan
Attorney, Agent, or Firm—Yount & Tarolli

[57] ABSTRACT

A power assisted steering gear has an internal valve member 10 capable of restricted rotation (in response to a steering input) relative to a valve sleeve 11 integral with a pinion 4 driving a rack bar 3. Control ports 13, 14 between the valve members 10 and 11 are adjusted in response to relative rotation between those members to control fluid flow to power assistance means. The valve members are rotationally biased relative to each other and to a neutral condition of the control ports by a C-shaped spring 21. The valve sleeve 11 and pinion 4 are axially restrained by a bearing 5. The valve member 10 is axially restrained by a compact arrangement of a rod 27 located in a co-axial bore 27a of the valve member 10 and secured by pin 21 for rotation with that valve member and carried by bearings 28 for rotation in the pinion 4. Bearing 28 restrains the rod 27 from axial displacement relative to the pinion. An end 30 of the rod 27 is slotted and in axial alignment with passage 32 in the pinion through which the rod can be rotated to facilitate its rotational orientation for alignment with the pin 21 during assembly of the gear.

14 Claims, 3 Drawing Figures

POWER ASSISTED STEERING GEAR

BACKGROUND ART

Power assisted steering gears are well known, particularly for motor vehicles, as comprising a valve member mounted in a valve sleeve member or a transmission member and rotationally displaceable relative thereto in response to a steering input to adjust control ports of the valve member. Adjustment of the control ports serves to control flow of fluid under pressure from an appropriate power source to power assistance means which would be included in a steering system incorporating the gear and would usually be in the form of a double acting piston and cylinder or ram device. Usually the relative displacement between the valve member and valve sleeve member or transmission member is restricted or resiliently restrained.

It is a consideration in the design of steering gears to ensure that the dimensions of the steering unit are reduced to a minimum which is practical and without loss of efficiency. By this not only will the manufacturing costs of the gear be reduced but the space which is necessary to accommodate the gear and steering system generally will be reduced and this is regarded as most desirable to facilitate the layout of a steering system for, and its accommodation in, a modern vehicle.

For valve components which are rotationally adjustable with respect to each other and in response to a steering input it is important, for efficient operation of the control ports between those components, to ensure that the axial positioning of the components with respect to each other is maintained constant and also that the components are restrained from axial displacement in a housing of the gear. Generally this restraint to axial displacement of the valve components is achieved by use of axial thrust bearings for each of those components. Not only are such thrust bearings relatively expensive but also their accommodation within the housing increases the volume of the housing and therefore the overall size of the gear.

It is an object of the present invention to provide a power assisted steering gear which comprises a valve member which is rotationally adjustable with respect to a valve sleeve member or a transmission member and which includes a compact arrangement for restraining axial displacement of the valve member relative to the member to which it is relatively rotatable and permits a general reduction in the overall size of the gear.

STATEMENT OF INVENTION AND ADVANTAGES

According to the present invention there is provided a power assisted steering gear comprising a housing; an axially rotatable transmission member in the housing; means restraining the transmission member from displacement axially relative to the housing; a valve member in the housing mounted for co-axial rotation with, and relative to, the transmission member, said relative rotation being effected in response to a steering input applied to an end part of said valve member extending from a side wall of the housing and serving to adjust control ports of the valve member for controlling fluid flow to power assistance means, and wherein the valve member is restrained from displacement axially relative to the housing by a rigid coupling borne for axial rotation by and restrained from displacement axially relative to one of said valve and transmission members and being connected to the other of said valve and transmission members.

Further according to the the present invention there is provided a power assisted steering gear comprising an inner valve member co-axially mounted in a valve sleeve member, said inner and valve sleeve members being rotatable in response to a steering input to provide a steering output and being rotationally displaceable relative to each other in response to said steering input to adjust control ports between those members for controlling fluid pressure flow to power assistance means for said steering output; restraining means restraining one of said valve members from axial displacement relative to a housing, and a rigid coupling borne for axial rotation by and restrained from axial displacement relative to said one valve member and being connected to the other valve member to restrain axial displacement of said other valve member relative to the one valve member.

The axially rotatable transmission member will usually be in the form of a toothed component, such as a pinion, the teeth of which engage with those of a toothed driven component, such as a rack bar, so that displacement of the toothed component by rotation of the transmission member provides a steering output. It is this steering output which will generally be provided with the fluid pressure operated power assistance means the fluid supply for which is controlled by adjustment of the control ports. The transmission member may be integrally formed with, or have secured thereto, the valve sleeve member within which is mounted the inner valve member. In such an arrangement the transmission member (and thereby the valve sleeve member which it carries) is usually restrained by appropriate restraining means from axial displacement relative to the housing (such restraining means may comprise, for example, an axial thrust bearing by which the transmission member is rotatably borne in the housing). With the restraining means applied to the transmission member or to the valve sleeve member, the rigid coupling serves to restrain axial displacement between the inner valve member and the valve sleeve member or transmission member as the case may be. Consequently the rigid coupling alleviates the requirement for an axial thrust bearing on the periphery of the inner valve member where, conventionally, such a thrust bearing would react between the inner valve member and either the valve sleeve member or the housing to restrain axial displacement of the inner valve member. The facility to omit this latter bearing permits an appreciable reduction in the overall size of the housing and in the gear generally.

Preferably the rigid coupling is of elongate form (conveniently it is a rod) which is co-axial with the valve member and extends axially within a bore of the, or the inner, valve member. A so located coupling may be connected at one end within the bore of the inner valve member for rotation therewith while its other end is borne for axial rotation and restrained from axial displacement by the transmission member or the valve sleeve member as the case may be.

This internal coupling between the members as aforementioned and the axial restraint which it provides to the inner valve member facilitates the design of a relatively compact gear. Furthermore, the inner valve member will usually be of generally cylindrical form with its control ports in the cylindrical surface and the internal coupling as aforementioned ensures that the inner valve member will be axially restrained even though an end part of its cylindrical surface may extend through a side wall of the housing.

For the purpose of facilitating assembly of the gear the rigid coupling, again of the preferred elongate form co-axial with the valve member, may have an end which is in axial alignment with an aperture in the member by which it is rotationally borne and through which aperture the rigid coupling can be rotationally adjusted relative to that member to facilitate rotational orientation of the coupling during assembly.

If required the rigid coupling, such as a rod or tube, can be rotationally borne by both the valve member and the sleeve member or the transmission member (as the case may be), such rotational bearings serving to restrain axial displacement between the rigid coupling and the members which it interconnects.

DESCRIPTION OF THE DRAWINGS

One embodiment of the present invention will now be described, by way of example only, with reference to the accompanying illustrative drawings, in which.

DETAILED DESCRIPTION OF THE DRAWINGS

Figure 1:
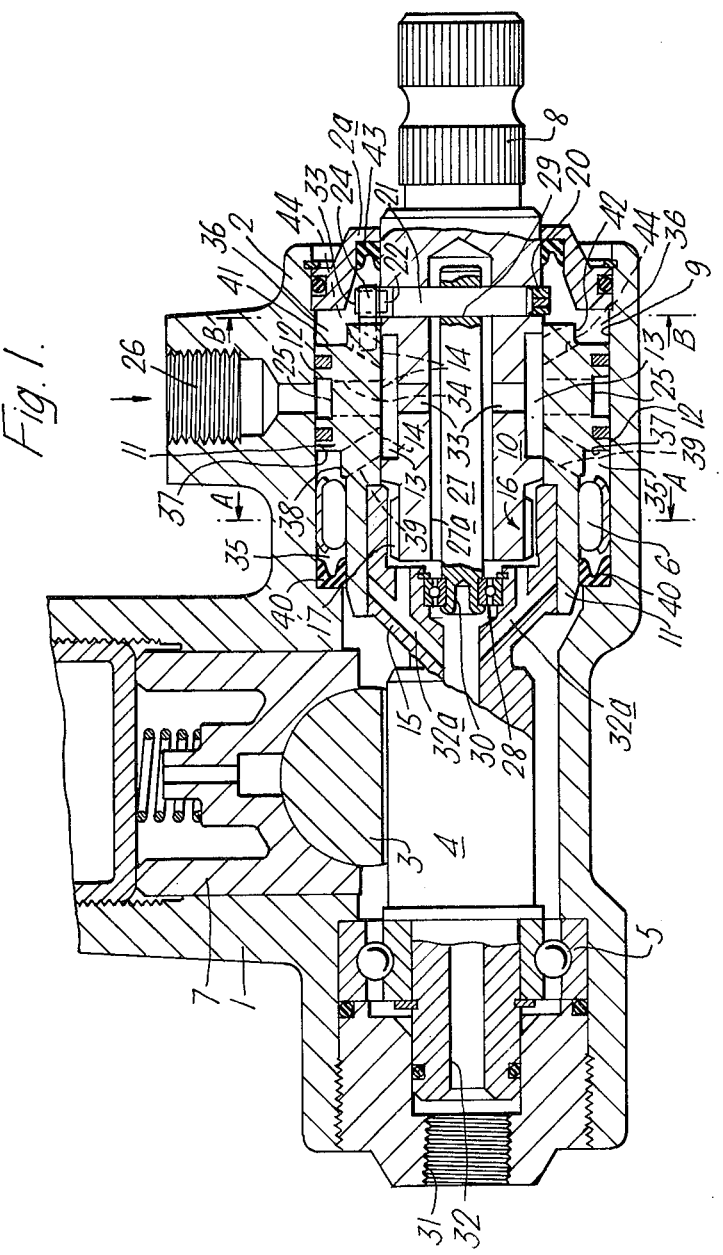
FIG. 1 is an axial section through a rack and pinion power assisted vehicle steering gear constructed in accordance with the present invention.

The steering gear is generally of the rack and pinion type comprising a rack housing 1 integrally formed with a valve housing 2. Extending longitudinally through the housing 1 is a rack bar 3 the teeth of which co-operate with a transmission member in the form of a pinion 4 mounted for axial rotation by ball bearings 5 in the housing 1 and roller bearings 6 in the valve housing 2. The bearings 5 additionally serve to restrain axial displacement of the pinion 4 relative to the housing 1. The rack bar 3 is biased to urge its teeth into engagement with the pinion 4 by a spring loaded yoke 7. Rotation of the pinion 4 is effected by rotation of an input shaft 8 so that driving engagement between the pinion teeth and rack bar teeth causes longitudinal displacement of the rack bar 3 through the housing 1. It is this latter displacement which is utilised to effect a steering manoeuvre in response to a rotational steering input on the shaft 8.

Figure 2:
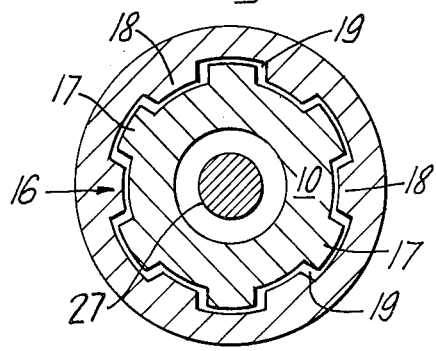
FIG. 2 is a radial part section taken on the line A—A of FIG. 1 and shows provision for mechanical coupling between the valve and valve sleeve members incorporated in the gear.

The steering system of which the rack bar 3 will form part will include power assistance means (not shown) which, for convenience, will be considered as a double acting piston and cylinder device to the piston chambers of which fluid pressure is to be supplied and exhausted to provide power assistance for movement of the rack bar 3 in accordance with conventional practice. A part length of the input shaft 8 extends into a sleeve cylinder 9 of the valve housing 2 and is formed as an inner, generally cylindrical, valve member 10. The valve member 10 is slidably received within a valve sleeve member 11 having an external annular face 12 which is slidably mounted in the sleeve cylinder 9. Provided in the valve member 10 at its interface with the sleeve member 11 is a circumferentially spaced array of axially extending control ports 13 which are intended to co-operate with control ports 14 in the valve sleeve member to control fluid flow to the piston and cylinder unit. The valve sleeve member 11 extends from the valve housing 2 into the rack bar housing 1 and is welded to (or may be integrally formed with) a tubular shaft part 15 of the pinion 4. The valve members 10 and 11 and the sleeve cylinder 9 are co-axial with the axis of rotation of the pinion 4 and while both valve members may be regarded as being rotatable with the pinion 4, the inner valve member 10 is capable of restricted rotational displacement relative to the valve sleeve member 11. This latter effect is achieved by a splined coupling indicated at 16 (see FIG. 2) where the inner end of the valve member 10 has a circumferentially spaced array of external splines 17 which are received between a circumferentially spaced array of internal splines 18 of the tubular shaft part 15. The axially extending recesses 19 within which the splines are received extend circumferentially to a greater extent then the respective splines 17 which they receive so permitting relative axial rotation between the valve members 10 and 11 to an extent where the inner and outer splines 17, 18 abut each other.

Figure 3:
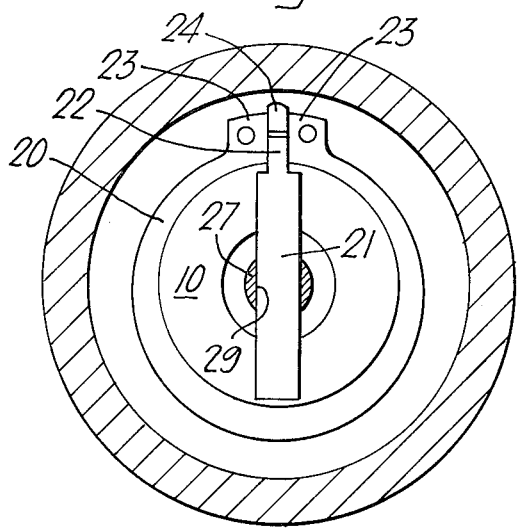
FIG. 3 is a radial part section taken on the line B—B of FIG. 1 and shows spring means for resiliently restraining relative rotation between the valve and valve sleeve members incorporated in the gear.

Carried on the inner valve member 10 is a "C" shaped spring 20 which serves to resiliently restrain relative rotation between the inner and outer valve members and rotationally bias those members to a predetermined neutral condition of the valve. The spring 20 encircles the valve member 10 and is conveniently located within an external annular recess of that member to be capable of expansion and contraction diametrically. A pin 21 extending diametrically through the valve member 10 has an end 22 which projects between the free ends 23 of the spring 20 to restrain the spring from displacement circumferentially about the valve member 10. Also projecting between the free ends 23 of the spring 20 is an axially extending peg 24 on the valve sleeve member 11 and it is the reaction of this peg 24 on one or other end 23 of the spring during relative rotation between the valve members 10 and 11 which causes the spring to enlarge diametrically and a biasing force to be applied between the two valve members urging them to return to their neutral condition as shown in FIG. 3.

The valve member 10 is mounted in the valve housing 2 within an end cap 2a (which may be regarded as part of the valve housing, so that its generally cylindrical face projects from the the valve housing. The valve member 10 is restrained from axial displacement relative to the housing 2 and thereby withdrawal from the valve housing through the end cap 2a by a rigid coupling in the form of a restraining rod 27. The rod 27 is rotatably mounted at one end by a ball bearing 28 co-axially within the tubular shaft part 15 of the pinion 4 and valve sleeve member 11 and is axially restrained relative to the pinion 4 within this bearing. The other end of the rod 27 projects into a blind bore 27a in the valve member 10 and has a cross bore 29 through which it is conveniently connected by the pin 21 to the valve member 10 for rotation therewith. To facilitate assembly of the valve members and in particular alignment of the cross bore 29 with the pin 21 during insertion of the latter, the rod 27 is provided with a slotted end 30 by which the rod 27 can be axially rotated manually to align its bore 29 to receive its pin 21 by insertion of, for example, a screwdriver through a port 31 in the rack bar housing and passage 32 extending axially through the pinion to align with the slot 30. The passage 32 conveniently provides a fluid return to exhaust or reservoir connected to the port 31 and is extended by fluid return passages 32a within the shaft part 15 communicating with the blind bore 27a. Return fluid from the control ports 13 and 14 is intended to pass into the blind bore 27a by way of radially extending passages 33 in the valve member 10 and hence to exhaust.

Machined in the annular face 12 of the valve sleeve member is an annular recess 25 which forms with the cylinder 9 an annular chamber which is in constant communication with an inlet port 26 which is intended to be connected to a source of fluid under pressure.

The recess 25 communiates through passage means 34 with the control ports 14. Two additional ports (not shown) are provided in the valve housing 2 to communicate one with each of two alternating pressure chambers 35 and 36 and these additional ports are intended for communication one to each of the piston chambers of the power assistance unit. The chamber 35 is partly defined by a radially extending end face 37 on the valve sleeve member 11 which extends inwardly from the annular face 12 and is formed as part of an annular rebate 38 on the valve sleeve member. The chamber 35 communicates by way of passages 39 in the valve sleeve member with the control ports 14 and is closed by a high pressure seal 40 between the valve housing 2 and the valve sleeve member 11. The roller bearing 6 is conveniently located within the chamber 35. The chamber 36 is partly formed by an end face 41 of the valve sleeve member 11 which extends radially inwardly from the annular face 12 and is part of an annular rebate 42 on the valve member 11. The chamber 36 is closed by the valve housing cap 2a and a high pressure seal 43 provided between the valve housing and the inner valve member 10. Passages 44 in the valve sleeve member 11 provide communication between the alternating pressure chamber 36 and the control ports 14.

The actual disposition, relative dimensions and function of the control ports 13 and 14 will be readily apparent to persons skilled in the art whereby upon relative rotation between the inner and outer valve members in response to a steering input on the shaft 8 fluid under pressure from the port 26 will be directed to one or other of the alternating pressure chambers 35 and 36 so that the piston chamber associated therewith will be pressurised while the other pressure chamber 36 or 35 will be connected to reservoir by way of a passage 33 and the blind bore 27a so that its associated piston chamber will be exhausted to effect the desired power assistance. In a neutral condition of the valve where there is no power assistance required fluid under pressure may flow direct to exhaust by way of the passages 33 and 27a while both alternating pressure chambers 35 and 36 are also in communication with the exhaust outlet port 31.

It will be particularly noted from FIG. 1 that the axial length of the annular face 12 is very short and is merely that which is required to accommodate the annular recess 25 and permit sealing of that recess from the adjacent chambers 35 and 36. The internal coupling by the rod 27 provides a compact means of restraining axial displacement between the two valve members and this together with the facility, in the present embodiment, to provide a short annular face 12 and thereby a short valve sleeve member 11 permits an appreciable reduction in the overall size required for the valve housing 2 and thereby in the size of the steering gear generally.

I claim:

1. A power assisted steering gear comprising a housing, an axially rotatable transmission member in the housing, means restraining the transmission member from displacement axially relative to the housing, a valve member in the housing mounted for coaxial rotation with and relative to the transmission member, said valve member having control ports for controlling fluid flow to a power assistance means and an end part extending from a side wall of the housing, said relative rotation being effected in response to a steering input applied to the end part of said valve member for adjusting the control ports of the valve member for controlling fluid flow to the power assistance means, a rigid coupling for restraining the valve member from displacement axially relative to the housing, a bearing supporting said rigid coupling for rotation relative to one of said valve and transmission members and restraining axial displacement of said rigid coupling relative of said one of said valve and transmission members, and means connecting said rigid coupling to the other of said valve and transmission members.

2. A gear as claimed in claim 1 in which the rigid coupling is connected to the said other member for rotation therewith.

3. A gear as claimed in claim 1 in which the rigid coupling is of elongate form co-axial with said valve member and extends axially within a bore of the valve member.

4. A gear as claimed in claim 1 in which the rigid coupling is of elongated form coaxial with said valve member, and an end of the rigid coupling is in axial alignment with an aperture in said one of said valve and transmission members, said rigid coupling having means engageable by a tool which extends through said aperture to rotate said coupling to thereby position said valve member in said housing.

5. A gear as claimed in claim 1 comprising a valve sleeve member located in said housing and fixidly connected with said transmission member and resilient biasing means acting between said valve member and said valve sleeve member for rotationally biasing said valve member and said valve sleeve member to a predetermined neutral condition.

6. A gear as claimed in claim 5 in which said rigid coupling is connected to said other of said valve and transmission members by pin means, and said pin means retaining said resilient biasing means on said other of said valve and transmission members, said resilient biasing means serving to provide said rotational biasing.

7. A power assisted steering gear comprising a housing, an inner valve member coaxially mounted in a valve sleeve member, an axially rotatable transmission member fixedly connected with said valve sleeve member, said inner valve member and said valve sleeve member defining control ports for controlling fluid flow to a power assistance means, said inner valve member and said valve sleeve member being rotationally displaceable relative to each other in response to a steering input to adjust said control ports for controlling fluid flow to a power steering assistance means, restraining means for restraining one of said valve members from axial displacement relative to the housing, a rigid coupling for restraining the other of said valve members from axial displacement relative to the housing, a bearing supporting said rigid coupling for rotation relative to said one of said valve members and restraining axial displacement of said rigid coupling relative thereto, and means connecting said rigid coupling to the other of said valve members.

8. A gear as claimed in claim 7 in which the valve sleeve member is restrained by said restraining means.

9. A gear as claimed in claim 7 in which an end part of the inner valve member extends from a side wall of the housing for receiving a rotary steering input.

10. A gear as claimed in claim 7 in which said rigid coupling is connected to said other of said valve members for rotation therewith.

11. A gear as claimed in claim 7 in which the rigid coupling is of elongate form co-axial with said valve members and extends axially within a bore of the inner valve member.

12. A gear as claimed in claim 7 and comprising resilient biasing means reacting between the inner valve member and the valve sleeve member, said means rotationally biasing its associated members relative to each other to a predetermined neutral condition of the control ports.

13. A gear as claimed in claim 12 in which the rigid coupling is connected to said other member for rotation therewith by pin means and said pin means retains spring means on said other member, said spring means serving to provide said rotational biasing.

14. A gear as claimed in claim 7 in which the rigid coupling is of elongated form coaxial with said valve members and an end of the rigid coupling is in axial alingment with an aperture in said one of said valve members, said rigid coupling having means engageable by a tool which extends through said aperture to rotate said coupling to thereby position said valve member in said housing.

* * * * *